(12) United States Patent
Wu et al.

(10) Patent No.: US 11,380,491 B2
(45) Date of Patent: Jul. 5, 2022

(54) MULTI-LAYER CHIP CERAMIC DIELECTRIC CAPACITOR

(71) Applicant: Dalian Dalicap Technology Co., Ltd., Dalian (CN)

(72) Inventors: Jiwei Wu, Dalian (CN); Xibi Liu, Dalian (CN); Yongyi Qi, Dalian (CN); Guoxing Yang, Dalian (CN); Chunku Cai, Dalian (CN); Fei Sun, Dalian (CN); Ying Sun, Dalian (CN)

(73) Assignee: Dalian Dalicap Technology Co., Ltd., Dalian (CN)

( * ) Notice: Subject to any disclaimer, the term of this patent is extended or adjusted under 35 U.S.C. 154(b) by 0 days.

(21) Appl. No.: 17/153,634

(22) Filed: Jan. 20, 2021

(65) Prior Publication Data

US 2022/0165498 A1 May 26, 2022

(51) Int. Cl.
*H01G 4/30* (2006.01)
*H01G 4/248* (2006.01)

(52) U.S. Cl.
CPC .............. *H01G 4/30* (2013.01); *H01G 4/248* (2013.01)

(58) Field of Classification Search
CPC .............. H01G 4/30; H01G 4/248; H01G 4/38
See application file for complete search history.

(56) References Cited

U.S. PATENT DOCUMENTS

| | | | | |
|---|---|---|---|---|
| 6,052,272 A * | 4/2000 | Kuroda | ................... | H01G 4/385 361/321.1 |
| 9,099,245 B2 * | 8/2015 | Lee | .......................... | H01G 4/12 |
| 10,176,922 B2 * | 1/2019 | Inomata | ................. | H01G 4/012 |
| 10,650,968 B2 * | 5/2020 | Koga | ................... | H01G 4/1236 |
| 10,930,433 B2 * | 2/2021 | Nakamoto | ............. | H01G 4/232 |

(Continued)

FOREIGN PATENT DOCUMENTS

| JP | 2000012377 A | 1/2000 |
|---|---|---|
| JP | 2013089947 A | 5/2013 |
| JP | 2020102483 A | 7/2020 |

OTHER PUBLICATIONS

Office Action dated Sep. 8, 2021 for European Application No. 21 153 148.8-1230.

(Continued)

*Primary Examiner* — Dion R. Ferguson
(74) *Attorney, Agent, or Firm* — Michael A. Bondi; Moss & Barnett

(57) ABSTRACT

Provided is a multi-layer chip ceramic dielectric capacitor, relating to the field of capacitor technologies. For the multi-layer chip ceramic dielectric capacitor provided in the present disclosure, first to fifth internal electrodes are reasonably arranged, and a first capacitance component, a second capacitance component, a third capacitance component and a fourth capacitance component are connected in series to form the capacitor, with the same capacitance, then according to the voltage division principle of capacitor, when each of the small capacitors connected in series bears a voltage of U0, the whole capacitor can withstand a voltage of 4U0. Therefore, the multi-layer chip ceramic dielectric capacitor, in a series structure, provided in the present disclosure can withstand higher direct current and radio-frequency voltages.

12 Claims, 2 Drawing Sheets

(56) References Cited

U.S. PATENT DOCUMENTS

| | | | |
|---|---|---|---|
| 2013/0100576 A1* | 4/2013 | Seo | H01G 4/12 |
| | | | 361/301.4 |
| 2013/0250472 A1* | 9/2013 | Lee | H01G 4/12 |
| | | | 361/301.4 |
| 2017/0221634 A1* | 8/2017 | Inomata | H01G 4/385 |
| 2019/0189346 A1* | 6/2019 | Koga | C04B 35/4682 |
| 2020/0118750 A1* | 4/2020 | Sugita | B41N 1/06 |
| 2020/0168396 A1* | 5/2020 | Nakamoto | H01G 4/232 |
| 2020/0265999 A1* | 8/2020 | Kuruma | H01G 4/012 |
| 2020/0343047 A1* | 10/2020 | Sugita | H01G 4/30 |
| 2021/0027949 A1* | 1/2021 | Kobayashi | H01G 4/012 |
| 2021/0057154 A1* | 2/2021 | Zenzai | H01G 4/232 |
| 2021/0057162 A1* | 2/2021 | Yamamoto | H01G 4/2325 |
| 2021/0098193 A1* | 4/2021 | Mishima | H01G 4/012 |
| 2021/0202172 A1* | 7/2021 | Kanzaki | H01G 4/008 |
| 2021/0375548 A1* | 12/2021 | Miyazaki | H01G 4/248 |

OTHER PUBLICATIONS

Office Action dated Feb. 15, 2022 for Japanese Application No. PG21002JP.

* cited by examiner

MULTI-LAYER CHIP CERAMIC DIELECTRIC CAPACITOR

REFERENCE TO RELATED APPLICATION

This application claims priority to Chinese Patent Application No. 2020113252858, filed with the Chinese Patent Office on Nov. 24, 2020, entitled "Multi-layer Chip Ceramic Dielectric Capacitor", which is incorporated herein by reference in its entirety.

FIELD OF THE INVENTION

The present disclosure relates to the field of capacitor technologies, and in particular, to a multi-layer chip ceramic dielectric capacitor.

BACKGROUND OF THE INVENTION

In ceramic electronic devices, a multi-layer ceramic capacitor includes a plurality of stacked dielectric layers, internal electrodes having dielectric layers interposed therebetween and arranged face to face, and an external electrode electrically connected to the internal electrodes. Due to their advantages such as small size, high capacity, and easy installation, the multi-layer ceramic capacitor has been widely applied to components for mobile communications, such as notebook computers, personal digital assistants (PDAs), and mobile phones.

The general-purpose multi-layer chip ceramic dielectric capacitor (MLCC) is in a parallel structure of multiple layers of parallel-plate capacitors, which is suitable for use under a condition where an operating voltage is less than 500 V, but cannot meet the requirements of a high operating voltage. Further, an apparatus using a series structure to increase a breakdown voltage appears, but due to its internal configuration problem, the increase of breakdown voltage of the apparatus is restricted, and it is still difficult to meet the requirements of a high operating voltage.

SUMMARY OF THE INVENTION

An embodiment of the present disclosure may be realized as follows.

In a first aspect, the present disclosure provides a multi-layer chip ceramic dielectric capacitor, including:
  a ceramic dielectric layer;
  a plurality of first electrode layers embedded in the ceramic dielectric layer, wherein the first electrode layer includes a first internal electrode, a second internal electrode and a third internal electrode spaced apart successively and located in the same plane, and the first internal electrode and the third internal electrode are exposed to two ends of the ceramic dielectric layer;
  a plurality of second electrode layers embedded in the ceramic dielectric layer, wherein the plurality of second electrode layers and the plurality of first electrode layers are alternately arranged at intervals, and the second electrode layer includes a fourth internal electrode and a fifth internal electrode spaced apart and located in the same plane; and
  external electrodes coated at two ends of the ceramic dielectric layer, wherein the two external electrodes are in electrical contact with the first internal electrode and the third internal electrode, respectively,
  wherein one end of the fourth internal electrode is corresponding to the adjacent first internal electrode, and forms a first capacitance component, and the other end of the fourth internal electrode is corresponding to the adjacent second internal electrode, and forms a second capacitance component, one end of the fifth internal electrode is corresponding to the adjacent second internal electrode, and forms a third capacitance component, and the other end of the fifth internal electrode is corresponding to the adjacent third internal electrode, and forms a fourth capacitance component, and the first capacitance component, the second capacitance component, the third capacitance component and the fourth capacitance component are successively connected in series.

BRIEF DESCRIPTION OF THE DRAWINGS

In order to more clearly illustrate technical solutions of embodiments of the present disclosure, accompanying drawings which need to be used in the embodiments will be introduced briefly below. It should be understood that the accompanying drawings below merely show some embodiments of the present disclosure, and therefore should not be considered as limitation to the scope. A person ordinarily skilled in the art still could obtain other relevant drawings according to these drawings, without using inventive effort.

Figure 1:
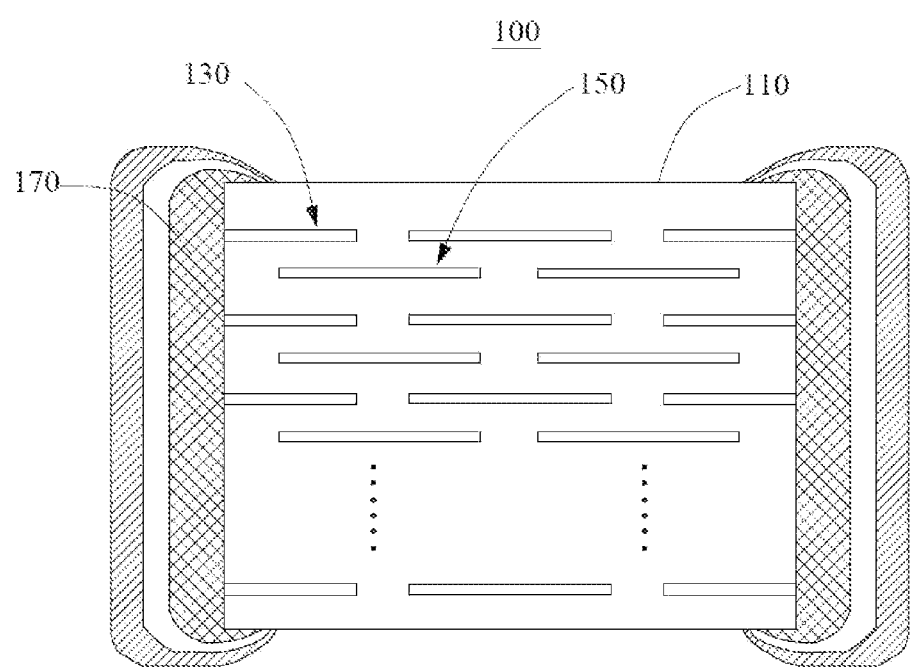
FIG. 1 is a schematic view of an internal structure of a multi-layer chip ceramic dielectric capacitor provided in an embodiment of the present disclosure.

Reference Signs: 100—multi-layer chip ceramic dielectric capacitor; 110—ceramic dielectric layer; 111—first coating layer; 113—second coating layer; 115—dielectric layer; 130—first electrode layer; 131—first internal electrode; 133—second internal electrode; 135—third internal electrode; 150—second electrode layer; 151—fourth internal electrode; 153—fifth internal electrode; 170—external electrode.

DETAILED DESCRIPTION OF THE INVENTION

In order to make the objectives, technical solutions and advantages of the embodiments of the present disclosure clearer, the technical solutions in the embodiments of the present disclosure will be described below clearly and completely in conjunction with the accompanying drawings in the embodiments of the present disclosure. Apparently, only some but not all embodiments of the present disclosure are described. Components in the embodiments of the present disclosure described and shown in the accompanying drawings herein generally may be arranged and designed in a variety of different configurations.

Therefore, the detailed description of the embodiments of the present disclosure provided in the accompanying drawings below is not intended to limit the scope of the present disclosure to be protected, but rather merely represents chosen embodiments of the present disclosure. Based on the embodiments in the present disclosure, all of other embodiments obtained by a person ordinarily skilled in the art, without using creative effect, fall within the scope of protection of the present disclosure.

It should be noted that similar reference signs and letters represent similar items in the following accompanying drawings, therefore, once a certain item is defined in one accompanying drawing, it is not needed to be further defined or explained in subsequent accompanying drawings.

In the description of the present disclosure, it should be noted that orientation or positional relationships indicated by terms such as "upper", "lower", "inner", and "outer" are based on orientation or positional relationships as shown in the accompanying drawings, or orientation or positional relationships of a product of the invention when being conventionally placed in use, merely for facilitating describing the present disclosure and simplifying the description, rather than indicating or suggesting that related devices or elements have to be in the specific orientation or configured and operated in a specific orientation, therefore, they should not be construed as limitation to the present disclosure.

Besides, terms such as "first" and "second", if appear, are merely for distinctive description, but should not be construed as indicating or implying importance in the relativity.

Objectives of the present disclosure include, for example, providing a multi-layer chip ceramic dielectric capacitor, which has a higher operating voltage, and can meet the requirement of a high operating voltage.

An embodiment of the present disclosure may be realized as follows.

In a first aspect, the present disclosure provides a multi-layer chip ceramic dielectric capacitor, including:
- a ceramic dielectric layer;
- a plurality of first electrode layers embedded in the ceramic dielectric layer, wherein the first electrode layer includes a first internal electrode, a second internal electrode and a third internal electrode spaced apart successively and located in the same plane, and the first internal electrode and the third internal electrode are exposed to two ends of the ceramic dielectric layer;
- a plurality of second electrode layers embedded in the ceramic dielectric layer, wherein the plurality of second electrode layers and the plurality of first electrode layers are alternately arranged at intervals, and the second electrode layer includes a fourth internal electrode and a fifth internal electrode spaced apart and located in the same plane; and
- external electrodes coated at two ends of the ceramic dielectric layer, wherein the two external electrodes are in electrical contact with the first internal electrode and the third internal electrode, respectively,
- wherein one end of the fourth internal electrode is corresponding to the adjacent first internal electrode, and forms a first capacitance component, and the other end of the fourth internal electrode is corresponding to the adjacent second internal electrode, and forms a second capacitance component, one end of the fifth internal electrode is corresponding to the adjacent second internal electrode, and forms a third capacitance component, and the other end of the fifth internal electrode is corresponding to the adjacent third internal electrode, and forms a fourth capacitance component, and the first capacitance component, the second capacitance component, the third capacitance component and the fourth capacitance component are successively connected in series.

In an optional embodiment, a first electrode gap between the first internal electrode and the adjacent second internal electrode is D1, a second electrode gap between the second internal electrode and the adjacent third internal electrode is D2, and a third electrode gap between the third internal electrode and the adjacent fourth internal electrode is D3, where D1=D2=D3.

In an optional embodiment, a fourth electrode gap between the fourth internal electrode and the adjacent external electrode is L1, and a fifth electrode gap between the fifth internal electrode and the adjacent external electrode is L2, where L1=L2.

In an optional embodiment, the fourth electrode gap L1 is greater than or equal to the first electrode gap D1.

In an optional embodiment, the sum of the first electrode layers and the second electrode layers is in odd number, and each of the second electrode layers is embedded between two of the first electrode layers.

In an optional embodiment, the first internal electrode, the second internal electrode, the third internal electrode, the fourth internal electrode and the fifth internal electrode have the same thickness.

In an optional embodiment, thickness of the first internal electrode is between 1 μm and 10 μm In an optional embodiment, the ceramic dielectric layer includes a first coating layer, a second coating layer and a plurality of dielectric layers, the first coating layer is provided at the top of the plurality of first electrode layers, the second coating layer is provided at the bottom of the plurality of second electrode layers, the plurality of dielectric layers are respectively provided between the adjacent first electrode layer and the second electrode layer, and located between the first coating layer and the second coating layer.

In an optional embodiment, the thickness of the dielectric layer is between 30 μm and 3000 μm.

In an optional embodiment, the thicknesses of the first coating layer and the second coating layer are both greater than the thickness of the dielectric layer.

Beneficial effects of the embodiments of the present disclosure include, for example:

for the multi-layer chip ceramic dielectric capacitor provided in the embodiments of the present disclosure, the first to fifth internal electrodes are reasonably arranged, and the first capacitance component, the second capacitance component, the third capacitance component and the fourth capacitance component are connected in series to form the capacitor, with the same capacitance, then according to the voltage division principle of capacitor, when each of the small capacitors connected in series bears a voltage of U0, the whole capacitor can withstand a voltage of 4U0. Therefore, the multi-layer chip ceramic dielectric capacitor, in a series structure, provided in the present disclosure can withstand higher direct current voltage and radio-frequency voltage.

As disclosed in Background Art, parallel-plate multi-layer capacitors generally used in existing multi-layer chip ceramic dielectric capacitor are connected in parallel, and usually suitable for an operating voltage below 500 V, but cannot satisfy a high-voltage operating state. However, the existing multi-layer capacitors in series can only realize two series structures due to an unreasonable layout of internal configuration thereof, and have limited effect on the increase of breakdown voltage, so that the operating voltage can only reach 3600 V at most. For a higher-voltage operating state, no corresponding capacitor can be satisfied in the prior art.

In addition, for the existing multi-layer chip ceramic dielectric capacitor, in a high-voltage state, the distribution of electric field near a capacitor end is uneven, then a phenomenon of arcing discharge of an electrode member tends to occur, and long-term discharging will burn the capacitor, and affect the capacitor quality.

In order to solve the above problems, embodiments of the present disclosure provide a multi-layer chip ceramic dielectric capacitor. It should be noted that features in the embodiments of the present disclosure may be combined with each other without conflict.

First Embodiment

Figure 2:
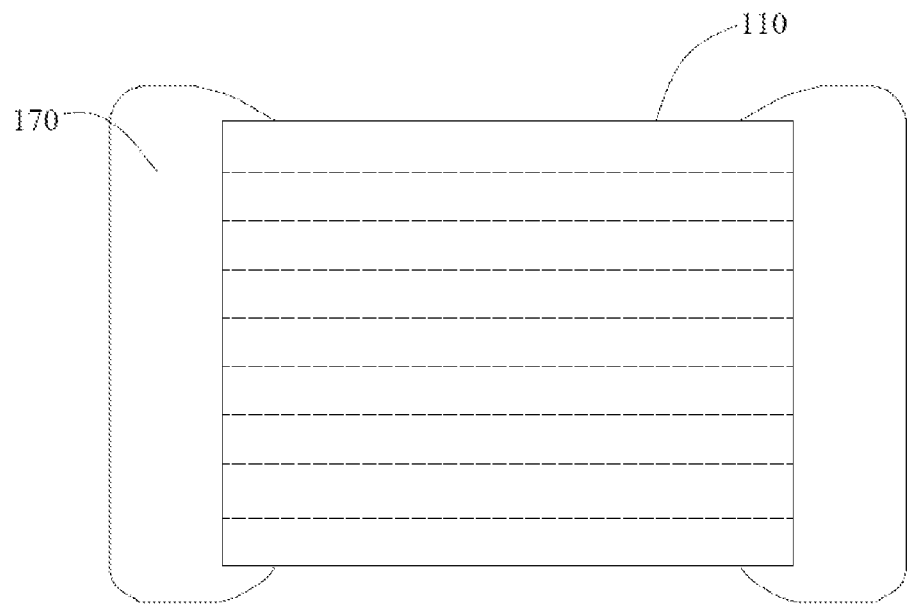
FIG. 2 is a schematic view of an external structure of the multi-layer chip ceramic dielectric capacitor provided in an embodiment of the present disclosure.
Figure 3:
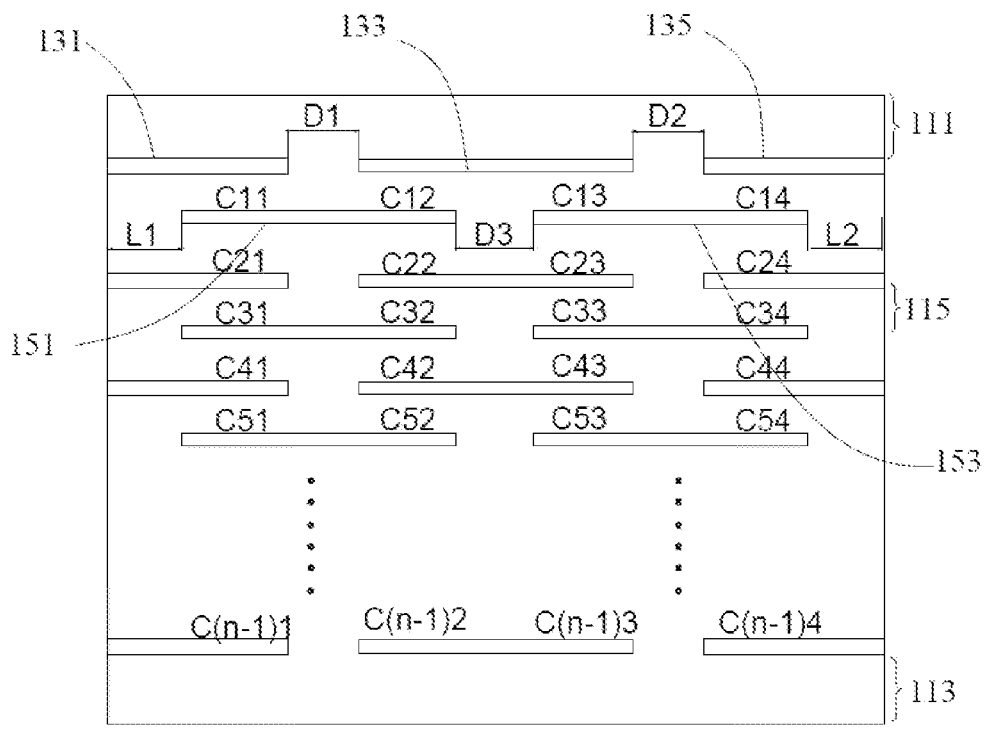
FIG. 3 is a structural schematic view of a ceramic dielectric layer in FIG. 1.

Referring to FIG. 1 to FIG. 3, the present embodiment provides a multi-layer chip ceramic dielectric capacitor 100, which can withstand higher direct current voltage and radio-frequency voltage, and meanwhile can enable the distribution of electric field on a surface of a ceramic body of capacitor to be even, thus avoiding the capacitor from generating the arcing discharge on the surface of the ceramic body under high voltage condition, and preventing the capacitor from being burnt.

The multi-layer chip ceramic dielectric capacitor 100 provided in the present embodiment includes a ceramic dielectric layer 110, a plurality of first electrode layers 130, a plurality of second electrode layers 150 and two external electrodes 170, wherein the plurality of first electrode layers 130 are embedded in the ceramic dielectric layer 110, the plurality of second electrode layers 150 are embedded in the ceramic dielectric layer 110, and the plurality of second electrode layers 150 and the plurality of first electrode layers 130 are alternately arranged at intervals, and the two external electrodes 170 are coated at two ends of the ceramic dielectric layer 110.

Each first electrode layer 130 includes a first internal electrode 131, a second internal electrode 133 and a third internal electrode 135 spaced apart successively and located in the same plane, and the first internal electrode 131 and the third internal electrode 135 are exposed to two ends of the ceramic dielectric layer 110; each second electrode layer 150 includes a fourth internal electrode 151 and a fifth internal electrode 153 spaced apart and located in the same plane; moreover, the first electrode layer 130 and the second electrode layer 150 are parallel to each other, and the two external electrodes 170 are in electrical contact with the first internal electrode 131 and the third internal electrode 135, respectively.

It should be noted that the multi-layer chip ceramic dielectric capacitor 100 provided in the present embodiment is a high-voltage, radio-frequency microwave capacitor. In the present embodiment, the first internal electrode 131 and the third internal electrode 135 extend to two end surfaces of the ceramic dielectric layer 110, respectively, and the two external electrodes 170 are coated on two end surfaces of the ceramic dielectric layer 110, and are in contact with the first internal electrode 131 and the third internal electrode 135, thereby realizing electrical connection.

In the above, one end of the fourth internal electrode 151 is corresponding to the adjacent first internal electrode 131, and forms a first capacitance component, and the other end of the fourth internal electrode 151 is corresponding to the adjacent second internal electrode 133, and forms a second capacitance component, one end of the fifth internal electrode 153 is corresponding to the adjacent second internal electrode 133, and forms a third capacitance component, and the other end of the fifth internal electrode 153 is corresponding to the adjacent third internal electrode 135, and forms a fourth capacitance component. The first capacitance component, the second capacitance component, the third capacitance component and the fourth capacitance component are successively connected in series.

It should be noted that, in the present embodiment, the first internal electrode 131, the second internal electrode 133, the third internal electrode 135, the fourth internal electrode 151 and the fifth internal electrode 153 are all in a plate shape, and provided at intervals with each other. The first internal electrode 131, the second internal electrode 133, and the third internal electrode 135 constituting the first electrode layer 130 and the fourth internal electrode 151 and the fifth internal electrode 153 constituting the second electrode layer 150 are provided in a staggered manner, wherein the fourth internal electrode 151 is transversely disposed between the first internal electrode 131 and the second internal electrode 133, with both left and right portions thereof corresponding to the first internal electrode 131 and the second internal electrode 133, respectively, and the fifth internal electrode 153 is transversely disposed between the second internal electrode 133 and the third internal electrode 135, with both left and right portions thereof corresponding to the second internal electrode 133 and the third internal electrode 135, respectively, thus constituting the first capacitance component, the second capacitance component, the third capacitance component and the fourth capacitance component in sequence. The first internal electrode 131 and the third internal electrode 135 are electrically connected to the external electrodes 170, so that the first capacitance component, the second capacitance component, the third capacitance component and the fourth capacitance component are successively connected in series, and their capacitances are equal. According to the voltage division principle of capacitor, when each of the capacitance components connected in series bears a voltage of U0, the whole capacitor can withstand a voltage of 4U0. Therefore, the multi-layer chip ceramic dielectric capacitor 100 provided in the present embodiment, which is a capacitor in a series structure, can withstand higher direct current and radio-frequency voltages.

In the present embodiment, the first capacitance component, the second capacitance component, the third capacitance component and the fourth capacitance component, which are successively connected in series, constitute an intermediate capacitor, and adjacent intermediate capacitors are connected in parallel, and finally constitute the multi-layer chip ceramic dielectric capacitor 100 in combination with the external electrodes 170.

It should be noted that, in the present embodiment, materials of the first internal electrode 131, the second internal electrode 133, the third internal electrode 135, the fourth internal electrode 151 and the fifth internal electrode 153 are the same, and all are metal materials, such as copper, palladium, silver palladium alloy, silver, and platinum, which are not specifically limited herein.

In the present embodiment, a first electrode gap between the first internal electrode 131 and the adjacent second internal electrode 133 is D1, a second electrode gap between the second internal electrode 133 and the adjacent third internal electrode 135 is D2, and a third electrode gap between the fifth internal electrode 153 and the adjacent fourth internal electrode 151 is D3, where D1=D2=D3.

In the present embodiment, a fourth electrode gap between the fourth internal electrode 151 and the adjacent external electrode 170 is L1, and a fifth electrode gap between the fifth internal electrode 153 and the adjacent external electrode 170 is L2, where L1=L2. Specifically, by reasonably setting the first electrode gap D1, the second electrode gap D2, the third electrode gap D3, the fourth electrode gap L1 and the fifth electrode gap L3, various internal electrodes of the first electrode layer 130 and the second electrode layer 150 are uniformly distributed, and meanwhile, as the first electrode layer 130 and the second electrode layer 150 are parallel to each other, it can be realized that alignment areas (or overlapping areas) and intervals between each two adjacent internal electrodes are the same, further ensuring that capacitances of the first capacitance component, the second capacitance component, the third capacitance component and the fourth capacitance component are the same, then guaranteeing that the voltage divided by each capacitance component is the same, the electric field intensity borne by each capacitance component is the same, thus no breakdown of a certain capacitance component will appear due to a higher divided voltage than that of other capacitance components.

In the present embodiment, the fourth electrode gap L1 is greater than or equal to the first electrode gap D1. Preferably, the fourth electrode gap L1 is equal to the first electrode gap D1. Meanwhile, in a width direction (left-right direction), the width of the second internal electrode 133, the width of the fourth internal electrode 151, and the width of the fifth internal electrode 153 are the same, the width of the first internal electrode 131 is the same as the width of the third internal electrode 135, and the width of the second internal electrode 133 is 3D1, the width of the first internal electrode 131 is 2D1, and the overall width of the ceramic dielectric layer 110 is 9D1, thereby further ensuring that the capacitances of the first capacitance component, the second capacitance component, the third capacitance component and the fourth capacitance component are the same.

In the present embodiment, the sum of the first electrode layers 130 and the second electrode layers 150 is in odd number, and each second electrode layer 150 is embedded between two first electrode layers 130. Specifically, the sum of the first electrode layers 130 and the second electrode layers 150 is in odd number, so as to ensure that the total number of layers of stacked electrodes is in odd number. Meanwhile, the plurality of second electrode layers 150 are embedded between the plurality of first electrode layers 130, then it is ensured that electrode patterns of an uppermost layer and a lowermost layer are the first internal electrode 131, the second internal electrode 133 and the third internal electrode 135, accordingly, the electric field distribution on the surface of the ceramic body of the capacitor is even, and the external electrode is prevented from generating the phenomenon of arcing discharge on the surface of the ceramic body under high voltage condition.

It should be noted that, in the present embodiment, the number of layers of stacked electrodes is in odd number, and meanwhile the uppermost layer and the lowermost layer are both first electrode layers, of which the electrode pattern is the first internal electrode 131, the second internal electrode 133 and the third internal electrode 135, that is to say, the electrode patterns of the uppermost layer and the lowermost layer are both directly electrically connected to the external electrodes 170, thereby avoiding the gap arranged between end portions of the external electrodes and the fourth internal electrode 151 and the fifth internal electrode 153.

For the conventional multi-layer ceramic dielectric capacitor, the internal electrode of the outermost layer and the end of the external electrode are in gap arrangement, when a voltage is applied across the capacitor, a tip electric field is formed at two ends of the capacitor and the internal electrode of the outermost layer, resulting in concentration of electric field intensity of the ceramic body near the two ends, and high electric field intensity, and easily causing the phenomenon of arcing discharge on the surface of capacitor. In the present embodiment, however, as the first internal electrode 131 and the third internal electrode 135 of the outermost layer, which are connected to the two ends, are connected to the ends (external electrodes), electric potentials are equal, and no tip electric field will be produced, therefore, the electric field distribution of the ceramic body near the two ends is even, the electric field intensity is much smaller than that of the structure of the common multi-layer ceramic dielectric capacitor, and the capacitor is less prone to arcing discharge.

Specifically, in the present embodiment, the total number of layers of stacked electrodes is n, below the first electrode layer 130 located at the first layer, the first capacitance component is C11, the second capacitance component is C12, the third capacitance component is C13, and the fourth capacitance component is C14, and below the second electrode layer 150 located at the second layer, the first capacitance component is C21, the second capacitance component is C12, the third capacitance component is C13, and the fourth capacitance component is C14. Therefore, below the second electrode layer 150 located at the (n−1)th layer, the first capacitance component is C(n−1)1, the second capacitance component is C(n−1)2, the third capacitance component is C(n−1)3, and the fourth capacitance component is C(n−1)4, and the first electrode layer 130 is located at the n-th layer.

In the present embodiment, the first internal electrode 131, the second internal electrode 133, the third internal electrode 135, the fourth internal electrode 151 and the fifth internal electrode 153 have the same thickness. Specifically, the thickness of the first internal electrode 131 is between 1 μm and 10 μm, and preferably, the thickness of the first internal electrode 131 is 5 μm.

The ceramic dielectric layer 110 includes a first coating layer 111, a second coating layer 113 and a plurality of dielectric layers 115 sintered in one piece, wherein the first coating layer 111 is provided at the top of the plurality of first electrode layers 130, the second coating layer 113 is provided at the bottom of the plurality of second electrode layers 150, the plurality of dielectric layers 115 are respectively provided between the adjacent first electrode layer 130 and the second electrode layer 150, and located between the first coating layer 111 and the second coating layer 113. Specifically, the ceramic dielectric layer 110 is formed by stacking ceramic films and then sintering the stacked ceramic films at high temperature, wherein the electrode pattern of the first electrode layer 130 is printed on the dielectric layer 115 by screen printing, and the electrode pattern of the second electrode layer 150 is printed on the dielectric layer 115 by screen printing, and wherein the film thicknesses of the first coating layer 111 and the second coating layer 113 are both greater than the film thickness of the dielectric layer 115, thus, the first coating layer 111 and the second coating layer 113 play a protective role, and also can isolate the end of the electrode and the internal electrode.

In the present embodiment, the plurality of dielectric layers 115 have the same thickness, so that the distance between the first electrode layer 130 and the second electrode layer 150 is the same everywhere, thereby ensuring that the capacitances of the first capacitance component, the second capacitance component, the third capacitance component and the fourth capacitance component are the same. Specifically, the thickness of the dielectric layer 115 is between 30 μm and 3000 μm, and preferably, the thickness of the dielectric layer 115 is 50 μm.

In the present embodiment, the ceramic dielectric layer 110 is made of various dielectric ceramics, such as alumina, corundum, mullite, forsterite, magnesium oxide, zirconium oxide, zircon, boron nitride, aluminum nitride, beryllium oxide, spodumene and various glass ceramics, which are not specifically limited herein.

In the present embodiment, each external electrode 170 is composed of an inner layer, an intermediate layer and an outer layer which are coated layer by layer, wherein the inner layer is made of silver or copper, the intermediate layer is made of electroplated nickel or copper, and the outer layer is made of electroplated tin.

A method for manufacturing the multi-layer chip ceramic dielectric capacitor 100 provided in the present embodiment is as follows: ceramic powder and organic binder are placed into a ball mill tank or a sand mill, and milled and dispersed for a certain period of time to form uniform ceramic slurry. Then, the ceramic slurry is cast on a polyester film (PET), and dried to form a ceramic thin film, that is, to form the dielectric layer 115. The internal electrode pattern is printed on the ceramic thin film by a screen printing method, and is dried again, wherein an internal electrode metal is silver, silver palladium alloy, platinum, nickel, copper or other metals. The ceramic thin films printed with the internal electrode are stacked, wherein the internal electrodes in the first electrode layer 130 and the second electrode layer 150 are staggered along a width direction of the capacitor, with a staggered distance being the width of the capacitor, and aligned in the width direction. A blank ceramic film may be added between the first electrode layer 130 and the second electrode layer 150, so as to increase the thickness of the dielectric layer 115 between the electrodes, and finally a thicker ceramic film is added at the top and bottom, respectively, as a protective film, thereby forming the first coating layer 111 and the second coating layer 113. A ceramic BAR block is placed in a hydrostatic press, to undergo hot pressing, so that various layers are closely bonded together. The hot-pressed ceramic BAR block is cut into required capacitor units. After the organic binder is discharged, the capacitor is high-temperature sintered to form the ceramic dielectric layer 110. Upon chamfering, the external electrode 170 is coated. First, silver or copper paste is adhered, followed by high-temperature sintering (about 600-820° C.), and then nickel and tin are electroplated in sequence, to form the multi-layer chip ceramic dielectric capacitor 100.

In the present embodiment, two electrode pattern screen designs are adopted to realize designs of the first electrode layer 130 and the second electrode layer, and for a specific method thereof, reference may be made to the electrode pattern screen design in the prior art.

In summary, for the multi-layer chip ceramic dielectric capacitor 100 provided in the present embodiment, the first internal electrode to the fifth internal electrode 153 are reasonably arranged, and the first capacitance component, the second capacitance component, the third capacitance component and the fourth capacitance component are connected in series to form the capacitor, then according to the voltage division principle of capacitor, when each of the small capacitors connected in series bears a voltage of U0, the whole capacitor can withstand a voltage of 4U0. Therefore, the multi-layer chip ceramic dielectric capacitor 100, in a series structure, provided in the present embodiment can withstand higher direct current and radio-frequency voltages. In addition, by designing the electrode patterns of the uppermost layer and the lowermost layer as the first internal electrode 131, the second internal electrode 133 and the third internal electrode 135, the electric field distribution on the surface of the ceramic body of the capacitor is even, thereby preventing the external electrode from generating the phenomenon of arcing discharge on the surface of the ceramic body under high voltage condition.

The above-mentioned are merely for specific embodiments of the present disclosure, while the scope of protection of the present disclosure is not limited thereto, and any variations or substitutions that would readily occur to any skilled person familiar with the present technical field should fall into the scope of protection of the present disclosure. Therefore, the scope of protection of the present disclosure should be determined by the scope of protection of the claims.

The invention claimed is:

1. A multi-layer chip ceramic dielectric capacitor, comprising:
   a ceramic dielectric layer;
   a plurality of first electrode layers embedded in the ceramic dielectric layer, wherein each of the first electrode layers comprises a first internal electrode, a second internal electrode and a third internal electrode, which are spaced apart successively and located in a same plane, and the first internal electrode and the third internal electrode are exposed to two ends of the ceramic dielectric layer;
   a plurality of second electrode layers embedded in the ceramic dielectric layer, wherein the plurality of second electrode layers and the plurality of first electrode layers are alternately arranged at intervals, and each of the second electrode layers comprises a fourth internal electrode and a fifth internal electrode, which are spaced apart and located in a same plane;
   external electrodes coated at the two ends of the ceramic dielectric layer, wherein two external electrodes are in electrical contact with the first internal electrode and the third internal electrode, respectively,
   wherein one end of the fourth internal electrode is corresponding to an adjacent first internal electrode, and forms a first capacitance component, and the other end of the fourth internal electrode is corresponding to an adjacent second internal electrode, and forms a second capacitance component, one end of the fifth internal electrode is corresponding to the adjacent second internal electrode, and forms a third capacitance component, and the other end of the fifth internal electrode is corresponding to an adjacent third internal electrode, and forms a fourth capacitance component, and the first capacitance component, the second capacitance component, the third capacitance component and the fourth capacitance component are successively connected in series,
   a first electrode gap between the first internal electrode and the adjacent second internal electrode is D1, a second electrode gap between the second internal electrode and the adjacent third internal electrode is D2, and a third electrode gap between the fourth internal electrode and an adjacent fifth internal electrode is D3, wherein D1=D2=D3, and
   a fourth electrode gap between the fourth internal electrode and an adjacent external electrode is L1, and a fifth electrode gap between the fifth internal electrode and an adjacent external electrode is L2, wherein L1=L2.

2. The multi-layer chip ceramic dielectric capacitor according to claim 1, wherein the fourth electrode gap L1 is greater than or equal to the first electrode gap D1.

3. The multi-layer chip ceramic dielectric capacitor according to claim 2, wherein the ceramic dielectric layer comprises a first coating layer, a second coating layer and a plurality of dielectric layers, wherein the first coating layer is provided at a top of the plurality of first electrode layers, the second coating layer is provided at a bottom of the plurality of second electrode layers, the plurality of dielectric layers are respectively provided between the first electrode layer and the adjacent second electrode layer, and located between the first coating layer and the second coating layer.

4. The multi-layer chip ceramic dielectric capacitor according to claim 1, wherein a sum of the first electrode layers and the second electrode layers is an odd number, and each of the second electrode layers is embedded between two of the first electrode layers.

5. The multi-layer chip ceramic dielectric capacitor according to claim 4, wherein the ceramic dielectric layer comprises a first coating layer, a second coating layer and a plurality of dielectric layers, wherein the first coating layer is provided at a top of the plurality of first electrode layers, the second coating layer is provided at a bottom of the plurality of second electrode layers, the plurality of dielectric layers are respectively provided between the first electrode layer and the adjacent second electrode layer, and located between the first coating layer and the second coating layer.

6. The multi-layer chip ceramic dielectric capacitor according to claim 1, wherein the first internal electrode, the second internal electrode, the third internal electrode, the fourth internal electrode and the fifth internal electrode have a same thickness.

7. The multi-layer chip ceramic dielectric capacitor according to claim 6, wherein the ceramic dielectric layer comprises a first coating layer, a second coating layer and a plurality of dielectric layers, wherein the first coating layer is provided at a top of the plurality of first electrode layers, the second coating layer is provided at a bottom of the plurality of second electrode layers, the plurality of dielectric layers are respectively provided between the first electrode layer and the adjacent second electrode layer, and located between the first coating layer and the second coating layer.

8. The multi-layer chip ceramic dielectric capacitor according to claim 6, wherein the first internal electrode has a thickness between 1 μm and 10 μm.

9. The multi-layer chip ceramic dielectric capacitor according to claim 8, wherein the ceramic dielectric layer comprises a first coating layer, a second coating layer and a plurality of dielectric layers, wherein the first coating layer is provided at a top of the plurality of first electrode layers, the second coating layer is provided at a bottom of the plurality of second electrode layers, the plurality of dielectric layers are respectively provided between the first electrode layer and the adjacent second electrode layer, and located between the first coating layer and the second coating layer.

10. The multi-layer chip ceramic dielectric capacitor according to claim 1, wherein the ceramic dielectric layer comprises a first coating layer, a second coating layer and a plurality of dielectric layers, wherein the first coating layer is provided at a top of the plurality of first electrode layers, the second coating layer is provided at a bottom of the plurality of second electrode layers, the plurality of dielectric layers are respectively provided between the first electrode layer and the adjacent second electrode layer, and located between the first coating layer and the second coating layer.

11. The multi-layer chip ceramic dielectric capacitor according to claim 10, wherein the dielectric layer has a thickness between 30 μm and 3000 μm.

12. The multi-layer chip ceramic dielectric capacitor according to claim 10, wherein each of thicknesses of the first coating layer and the second coating layer is greater than a thickness of the dielectric layer.

* * * * *